June 29, 1965   S. J. HALTER   3,191,520
CORRUGATED FOIL BAKING PAN
Filed July 24, 1963
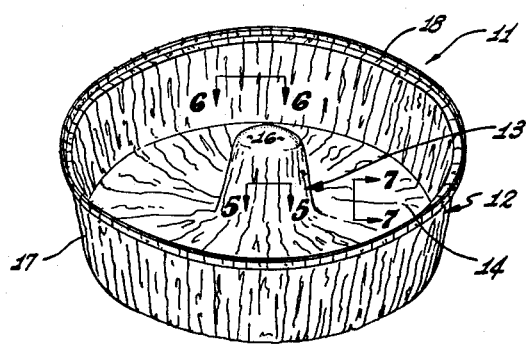
Fig. 1
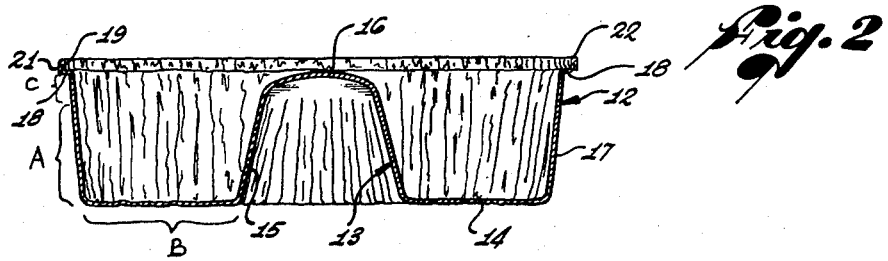
Fig. 2
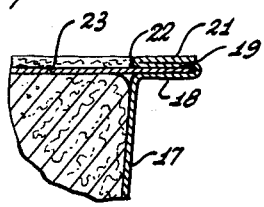
Fig. 3
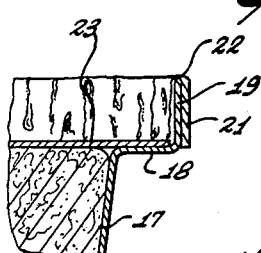
Fig. 4
Fig. 5
Fig. 6
Fig. 7
INVENTOR.
STANLEY J. HALTER
BY James E. Tooney United States Patent Office 3,191,520
Patented June 29, 1965

3,191,520
CORRUGATED FOIL BAKING PAN
Stanley J. Halter, Mundelein, Ill., assignor to Kaiser Aluminum & Chemical Corporation, Oakland, Calif., a corporation of Delaware
Filed July 24, 1963, Ser. No. 297,315
7 Claims. (Cl. 99—442)

The present invention relates to disposable receptacles or pans, and more particularly to a novel disposable receptacle made of a single, continuous piece of relatively thin and flexible, yet self-sustaining material, such as aluminum foil, and having a central continuous wall, generally in the form of a horn, which limits the receptacle space to an annular ring of substantial depth characteristic of pans for baking angel food cakes and for ring molds generally.

Various receptacles have heretofore been made out of thin disposable aluminum foil for packaging pies, cakes and frozen food products generally, but prior to the present invention, there has not been available an annular receptacle having an integral central horn and formed of a single, continuous piece of disposable foil.

For reasons of economy, disposable receptacles are preferably made of extremely thin, light-metal foil, such as aluminum foil of a gauge between .002" and .0059" in thickness and bent and folded into the desired shape. In forming annular receptacles, it has been customary to form only the outer pan portion from a single piece of foil and to mount in the center of the pan a separate horn element of like or different material. This two-piece annular receptacle is obviously more expensive and ordinarily weaker than the unitary, disposable, annular receptacle according to the present invention which represents a substantial advance in the art in providing a one-piece annular receptacle adapted for the baking of angel food cakes and for ring molds, and formed from a single, continuous piece of thin aluminum foil.

Accordingly, the primary object of the present invention is to proivde a novel disposable annular receptacle made of thin flexible material, such as thin aluminum foil, having an integral central horn formed, with the outer body portion of the receptacle, from a single, continuous piece of foil.

Other objects, advantages and features of the present invention will be readily apparent from the following detailed specification and the appended drawings, in which:

FIGURE 1 is a perspective view of an annular receptacle according to the present invention in the form of an angel food cake pan;

FIGURE 2 is a vertical sectional view through the pan of FIGURE 1 on an enlarged scale;

FIGURE 3 is a partial enlarged detailed view adjacent the upper edge of FIGURE 2 showing a cover mounted on the pan;

FIGURE 4 is a detailed view similar to FIGURE 3 with the cover in place prior to the bending of the rim portion of the pan thereover;

FIGURE 5 is a partial transverse sectional view through the side wall of the receptacle horn, taken at line 5—5 of FIGURE 1;

FIGURE 6 is a partial transverse sectional view through the outer side wall of the receptacle, taken at line 6—6 of FIGURE 1; and FIGURE 7 is a partial transverse sectional view through the bottom wall of the receptacle, taken at line 7—7 of FIGURE 1.

The receptacle of the present invention may be formed by bending and folding a single, continuous piece of foil between cooperating die portions on a press. While this may be referred to as a drawing operation, it will be understood that due to the thinness of the foil which is used, there is substantially no stretching of the material to further reduce its thickness. The pressuring or drawing of the receptacle is instead accompanied by the excess material in the foil blank automatically being formed into folds or corrugations in the bottom and inner and outer side walls and in the outer edge of the receptacle.

The annular receptacle of this invention is generally designated by the numeral 11 and includes an outer pan portion 12 and an inner, integral horn 13 projecting upwardly at the center of the bottom wall 14 of the pan. The horn 13 is formed by a generally frusto-conical inside sidewall 15 and a top wall 16. The pan portion 12 has an upwardly diverging outer side wall 17 extending from and integral with the outer edge of the bottom wall 14.

The wall 15 diverges downwardly and the wall 17 diverges upwardly so as to facilitate the separation of the contents of the receptacle from the receptacle itself, and this arrangement also provides for the ready stacking of the receptacles by nesting one within the other prior to the filling of the receptacles with the material to be packed therein and thereby facilitates the shipping of the receptacles prior to use.

The upper edge of the outer side wall 17 is provided with an outwardly extending ledge or flange 18. A wall 19 extends upwardly from the outer edge of the flange 18 and the final edge is return bent downwardly at 21 to provide a smooth upper edge 22 on the receptacle.

It will be apparent that the receptacle 11 is symmetrical in all directions from the top wall 16 of the horn 13 and this top wall 16 is constituted by the center of the foil blank from which the receptacle is formed and all other parts of the receptacle are related to this central, relatively undisturbed portion of the foil blank. The wall 16 is therefore substantially free from folds or wrinkles therein. All other walls of the receptacle will have excess foil material therein which becomes folded in wrinkles or corrugations, at random, as the receptacle is drawn or formed between the dies in the forming press and in particular those wall areas designated by B in the bottom wall and A in the outside side wall 17 in FIGURE 2. In other words, the majority of the folds will occur and are allowed to purposely occur without being substantially compressed in the bottom 14 and the area A of side wall 17. Area C of side wall 17 has corrugations of less prominence than area A since the corrugations tend to flatten out and diminish in the upper portion of the side wall. Thus, it can be said that the area A which constitutes more than half of the side wall 17 contains the majority of the uncompressed corrugations of the side wall 17 and thus is relatively thicker or of relatively greater average thickness between the apparent planes of its opposed surfaces than the top side wall portion C. Area A on the side wall can also be defined as the lower segment of wall 17 and area C as the upper segment of wall 17, with area A constituting between ⅔ to ¾ of the total height or surface area of wall 17.

The folds or wrinkles in the wall 15 of the central horn are preferably relatively tightly compressed in the forming operation, as shown in FIGURE 5, so as to present a relatively smooth surface on the horn by which it readily separates from the material packaged in the annular receptacle cavity when the receptacle is removed from its contents.

The folds or wrinkles in the area C of the outer side wall 17 are also preferably compressed, as shown in FIGURE 6, to likewise present a relatively smooth surface to the receptacle contents to facilitate removal of the receptacle therefrom.

The compressing of the folds or wrinkles in the walls 15 and 17 also facilitates the nesting of the empty receptacles prior to use.

The folds or wrinkles in the walls 19 and 21 are preferably tightly compressed so as to occupy a minimum planar thickness so that the return bending of the wall 21 to form the smooth upper edge 22 is simplified.

The folds or wrinkles in the bottom wall 14 are not tightly compressed, and thus the wall is left relatively thick or left with a relatively greater average thickness for increased rigidity and strength. The area A of outer side wall 17 of the receptacle where the folds occur as indicated above is also preferably not fully compressed, likewise to add rigidity and strength to the pan, since it is in the bottom and the lower segment of the outer side wall 17 that rigidity and strength are particularly desirable, as these are the areas of the pan which are usually contacted by handling equipment during pan filling, baking and covering operations and require the greatest strength.

The receptacle according to the present invention is, as stated, formed of a single, continuous blank of disposable, light-metal foil, such as aluminum, and preferably of a thickness between .002″ and .0059″. The size of the receptacle will, of course, vary widely with the size of the cake or other material to be packaged therein, and the ratio of depth to diameter of the pan may be widely varied without departing from the spirit of the invention. By way of example only, one ratio which has proved efficacious in use is a top diameter 3½ times the pan depth. The inclination or divergence to be given to the walls 15 and 17 is not critical but may be widely varied while still retaining a desirable receptacle configuration. One optimum example for the outer side wall 17, with the ratio of top diameter to depth previously given, is an inclination to a bottom diameter of 3. The wall 15 of the central horn preferably has a greater inclination or divergence than the wall 17 because of its smaller diameter, to facilitate its separation from the cake or other material packaged in the receptacle.

In completing the packaging of the receptacle, for example after the baking of an angel food cake therein, a cover plate 23 is placed within the top of the receptacle upon the ledge 18, as shown in FIGURE 4. The cover 23 may be of paperboard, plastic, foil or combination thereof and, if desired, may be provided with a transparent window in an opaque body to display the contents of the receptacle package. With the cover 23 in place, as in FIGURE 4, the top edge of the receptacle formed by the walls 19 and 21 is rolled inwardly to the position of FIGURE 3 to securely attach the cover to the receptacle to complete the package.

While a certain preferred embodiment of the invention has been specifically illustrated and described herein, it is understood that the invention is not limited thereto, as many variations will be apparent to those skilled in the art, and the invention is to be given its broadest interpretation within the terms of the following claims, wherein

What is claimed is:

1. An annular receptacle for food products and the like comprised of a single, continuous piece of thin, readily bendable, yet self-sustaining aluminum foil of a few thousandths of an inch in thickness, said receptacle including a thickened bottom of relatively uncompressed corrugations, an outer corrugated side wall, the lower segment of said outer side wall constituting the major portion thereof and comprising substantially uncompressed corrugations and being of relatively greater average thickness as compared to the remainder of said outer side wall, and a central integral horn projecting upwardly from said bottom wall and defining, between the outer surface of the horn and the inner surface of the side wall, an annular product-receiving space, said horn extending upwardly substantially to the useful height of said side wall, the upper edge of said side wall having an integral, outwardly extending, cover-receiving ledge and an integral terminal edge foldable over said ledge to secure the cover to the receptacle.

2. A receptacle as set forth in claim 1 wherein the lower segment of the outer side wall comprises between ⅔ to ¾ of the surface area of the outer side wall.

3. A receptacle as set forth in claim 2 wherein the ratio of depth to outer diameter at the top of the receptacle is substantially 1 to 3½ and the ratio of depth to outer diameter at the bottom of the receptacle is substantially 1 to 3.

4. An annular receptacle for food products and the like comprised of a single, continuous piece of thin, readily bendable, yet self-sustaining aluminum foil of a few thousandths of an inch in thickness, said receptacle including a bottom, an outwardly flaring, outer side wall and a central integral horn projecting upwardly from said bottom wall and defining, between the outer surface of the horn and the inner surface of the side wall, an annular product-receiving space, said horn extending upwardly substantially to the useful height of said side wall, the material of the foil blank being substantially wrinkled in the bottom and lower segment of the outer side wall of the receptacle and the side wall of the central horn, the side wall of said central horn diverging toward the bottom wall of the receptacle to provide a substantially frusto-conical shape to the horn, the side wall folds of said central horn being compressed to provide a substantially smooth outer horn surface contacting the product within the receptacle, the folds in the bottom and lower segment of the outer side wall of the receptacle being less tightly compressed than in the wall of the central horn whereby the bottom and lower segment of the outer side wall are of relatively greater average thickness to provide added rigidity and strength to the bottom and outer side wall of the receptacle.

5. The annular receptacle as defined in claim 4 in which the outer side wall and the wall of the central horn incline oppositely and the wall of the central horn to a greater degree.

6. The annular container as defined in claim 1 in which the ultimate edge of the receptacle presents a smooth surface provided by a return bent wall portion thereat.

7. The annular receptacle defined in claim 4 in which the ratio of depth to outer diameter at the top of the receptacle is substantially 1 to 3½ and the ratio of depth to outer diameter at the bottom of the receptacle is substantially 1 to 3.

References Cited by the Examiner

UNITED STATES PATENTS

| 1,476,910 | 12/23 | Naugle | 99—428 |
| 1,906,592 | 5/33 | Hiester | 99—428 |
| 2,875,683 | 3/59 | Burns | 99—428 |
| 2,960,218 | 11/60 | Cheeley | 99—439 X |
| 2,960,255 | 5/60 | Brunn | 229—35 |

FOREIGN PATENTS

| 87,510 | 5/56 | Norway. |

EUGENE R. CAPOZIO, *Primary Examiner.*

JEROME SCHNALL, *Examiner.*